Jan. 12, 1937.  J. E. PADGETT  2,067,282

METHOD OF MAKING JOINT MEMBERS

Filed Aug. 1, 1934

INVENTOR
JOSEPH E. PADGETT
Kwis, Hudson & Kent
ATTORNEYS

Patented Jan. 12, 1937

2,067,282

UNITED STATES PATENT OFFICE 2,067,282

METHOD OF MAKING JOINT MEMBERS

Joseph E. Padgett, Toledo, Ohio

Application August 1, 1934, Serial No. 737,955

1 Claim. (Cl. 29—152)

This invention relates generally to joint members of an economical form of construction and to novel method of making such members.

An object of this invention is to provide an improved joint member formed of sheet metal, and to a novel method of economically producing such joint members.

A further object of this invention is to provide a joint member constructed of sheet metal and having spline elements formed thereon.

It is also an object of the present invention to provide an improved splined joint of much lighter, yet stronger construction than has been available heretofore, and also to provide a novel method for economically producing the members for such joint.

Other objects and advantages of the invention will be apparent from the following description when taken in conjunction with the accompanying sheet of drawings, wherein Fig. 1 is an elevational view, partly in section, showing a yoke produced by the method of my invention;

In the accompanying drawing to which detailed reference will now be made, I have shown several joint members and have illustrated my novel method of making the same. While my invention is disclosed as relating particularly to members for universal joints, it will be understood of course that my novel method may be applied to the economical production of various joint members.

In Figs. 1 to 7 inclusive I have shown joint members which are of novel construction, and which may be produced from sheet metal according to the method of my invention. This method will presently be described in detail, but, in general, comprises forming two or more complemental parts or sections from sheet metal and then connecting the preformed complemental parts, as by welding, to form the desired joint member.

Figure 1:
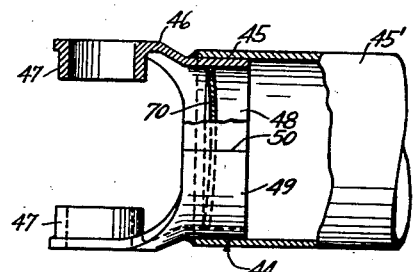
Figure 2:
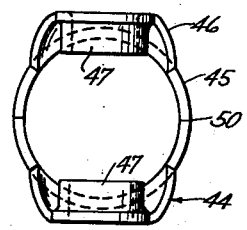
Fig. 2 is an end view thereof.

In Figs. 1 and 2 I have shown a joint member in the form of a yoke 44 which may be used in a universal joint. The yoke 44 is provided with a tubular connecting part 45, to which a power transmitting element, such as the shaft 45', may be connected, and a pair of opposed yoke arms 46 having integrally formed tubular bearing or trunnion supports 47 thereon.

The yoke 44 is constructed from sheet metal, and according to my novel method may be produced by forming complemental sections, in this case two complemental sections 48 and 49, from sheet metal blanks of suitable size, shape and thickness. In forming the complemental sections 48 and 49 the sheet metal blanks may be suitably worked, as by subjecting the same to one or more drawing operations, whereby a portion of the blank is shaped to form a portion of the tubular connecting part 45 of the yoke, and whereby another portion of each blank forms a yoke arm 46 having a tubular bearing or trunnion support 47 thereon.

These preformed complemental sections are arranged in proper relation and are connected together as by welding along the meeting edges 50 of the portions which form the tubular connecting part 45. The yoke thus formed is of very light, accurate and economical construction, such that when used in a universal joint structure it will render very satisfactory service with minimum vibration.

Figure 5:
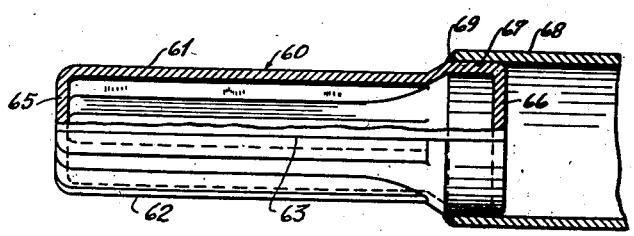
Fig. 5 is an elevational view, partly in section, showing a splined joint member produced by my method.
Figure 6:
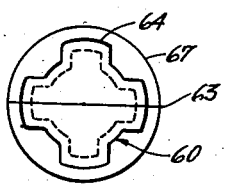
Fig. 6 is an end view thereof.
Figure 7:
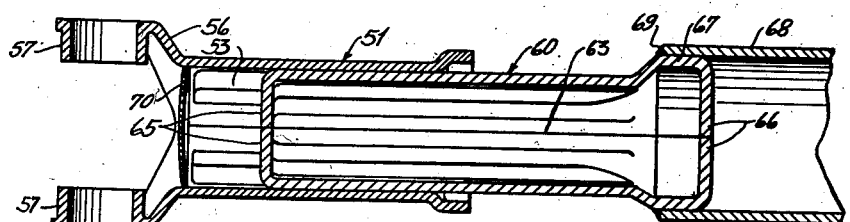
Fig. 7 is a sectional view showing the splined joint members of Figs. 3 and 6 in cooperating relation.

In Figs. 3 to 7 of the drawing I have shown other joint members, which may be produced by the method just explained in connection with Figs. 1 and 2. These joint members provide an improved splined connection or joint, as shown in Fig. 7, which is especially suitable for use in the propeller shaft of a motor vehicle.

Before proceeding with the detailed description of these joint members, it might be advantageously explained that the use of higher engine speeds in motor vehicles has, in recent years, become more and more desirable but that engine speed has been limited by various factors one of which is the critical speed of rotation of the propeller shaft. Heretofore the stub shaft of the splined joint or connection of the propeller shaft has been a solid shaft of relatively small diameter to which the tubular part of the shaft was connected. Since the critical speed of the propeller shaft varies with the diameter of the tube and this diameter has already been increased with the increased engine speeds, the art is now at the point where the stub shaft of the splined connection is the weakest part of the propeller shaft.

To increase the diameter of the solid stub shaft would materially increase its cost of manufacture. At the same time the added weight of an enlarged stub shaft hanging between the centers of the universal joints would be objectionable and, because of its tendency to cause whipping of the propellor shaft, would offset the advantage to be obtained by enlarging the stub shaft. To solve this problem I have devised the hollow joint members of Figs. 3 to 7 whereby the large diameters, which are so desirable for the members of a splined propeller shaft joint, are obtained without increasing the weight of those members.

Figure 3:
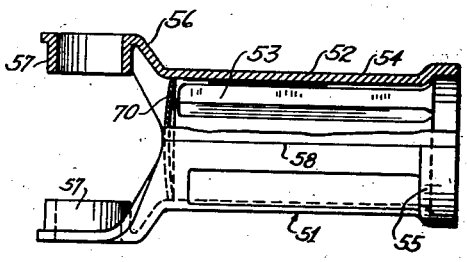
Fig. 3 is an elevational view, partly in section, showing a yoke similar to that of Fig. 1 but having spline elements thereon.

The joint member 51 of Fig. 3 is a yoke which differs from the yoke of Fig. 1 principally in that its connecting part is in the form of a sleeve 52. This sleeve is shown in Fig. 7 as forming a part of a splined joint for a propeller shaft, and to this end, is provided with spline elements such as the spline grooves 53 which are formed as integral parts of the wall of the sleeve.

In producing the yoke 51, complemental parts or sections 54 and 55 are formed from sheet metal blanks, by suitable stamping or drawing operations, so that each such section comprises a sleeve part having the integral spline elements 53 thereon, and a yoke arm 56 having an integrally formed tubular bearing or trunnion support 57. These sections 54 and 55 are arranged in their respective positions to form the desired joint member and, when thus arranged, may be connected together by welding the meeting edges 58 of the sleeve portions. The sheet metal yoke thus produced is of light weight, accurate and economical construction and may be advantageously used in a propeller shaft or the like.

In Figs. 5 and 6 I have shown, as another joint member, a splined stub shaft 60 adapted to be telescoped into the splined sleeve 52 of the yoke 51, as shown in Fig. 7 of the drawing. The splined shaft 60 may also be produced according to my novel method by forming two or more complemental shaft sections 61 and 62 from suitable sheet metal blanks, and then connecting such sections together as by welding along the meeting edges 63, to form the desired joint member. In forming the complemental sections 61 and 62 the sheet metal blanks may be subjected to suitable drawing or shaping operations, whereby each section is provided with integrally formed spline elements, such as the teeth 64, which, in the assembled joint illustrated in Fig. 7, slidably engage in the spline grooves 53 of the yoke 51.

In the forming operation the complemental sections 61 and 62 may also be provided, respectively, with cooperating end flanges 65 and 66, to close the ends of the stub shaft, and may also be provided with cooperating parts forming an enlargement 67, to which a propeller shaft tube 68, or other power transmitting element, may be connected as by welding indicated at 69. The end closures formed by the flanges 65 and 66 materially strengthen the hollow stub shaft against distortion or collapse.

It will be observed that in forming the splined joint members of Figs. 3 and 5 from sheet metal according to my novel method, the splined sleeve of Fig. 3 and the splined shaft of Fig. 5 can be formed hollow and of large diameter as compared with a diameter which would be practical for corresponding cooperating splined parts formed on similar joint members constructed as forgings or castings.

This large diameter hollow sheet metal construction for the splined parts has important advantages in that it is a stronger construction as well as a lighter weight construction. It is also a more economical construction because of its light weight, and because the parts themselves, and the spline element thereon, can be accurately formed with little or no machining being required and with only a small amount of waste metal being discarded. A further advantage in having the spline elements on a large diameter, as in the present construction, is that the actual load and the bearing pressures on the splines are thereby reduced with a corresponding reduction in objectionable frictional effects during spline travel.

Figure 4:
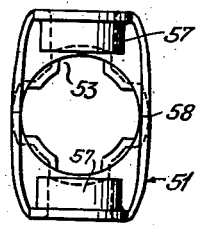
Fig. 4 is an end view thereof.

In forming the cooperating splined joint members of Fig. 7, any suitable number of spline elements may be provided on these members but when these members are produced according to my novel method, I prefer to construct them with four spline elements on each member, as shown in Figs. 4 and 6. When four spline elements are provided, the complemental sheet metal sections constituting the joint members can be produced with simple forming operations and die apparatus, and the need for complicated dies and indexing apparatus is avoided.

It may be desirable to reinforce the tubular connecting part or sleeve of the sheet metal yokes to prevent distortion of these parts under certain load conditions, and for this purpose I have shown a transverse reinforcing web 70 in the yokes of Figs. 1 and 3. This web may be of any suitable form of construction, such as the sheet metal disk shown in this instance, which may be retained in place in the sleeve by being expanded, pressed or welded therein.

From the foregoing description and the joint members illustrated, it will now be understood that I have provided a novel form of joint member of sheet metal construction, and a novel method of producing such joint members.

While I have illustrated and described the improved yoke and method of my invention in a detailed manner, it will be understood of course that I do not wish to be limited to the precise details of construction and steps of procedure herein disclosed, but regard my invention as including such changes and modifications as do not involve a departure from the spirit of the invention and the scope of the appended claim.

Having thus described my invention, I claim:

The method of making splined joint members which comprises shaping sheet metal into elongated transversely curved parts, drawing an intermediate longitudinal portion of each part substantially radially to form full splines thereon and drawing longitudinal edge portions substantially radially to form partial splines, arranging said parts in complemental relation, and with the partial splines in meeting arrangement, to constitute a tubular joint member, and then connecting said parts by welding.

JOSEPH E. PADGETT.